United States Patent [19]

Wakabayashi

[11] 4,268,148
[45] May 19, 1981

[54] MOTOR DRIVE MECHANISM

[75] Inventor: Hiroshi Wakabayashi, Yokohama, Japan

[73] Assignee: Nippon Kogaku K.K., Tokyo, Japan

[21] Appl. No.: 39,203

[22] Filed: May 15, 1979

[30] Foreign Application Priority Data

May 17, 1978 [JP] Japan .......................... 53-64957[U]

[51] Int. Cl.³ .......................... G03B 1/18; B03B 7/26
[52] U.S. Cl. ................................. 354/173; 354/60 R
[58] Field of Search .................... 354/60 R, 171, 173, 354/212, 266; 352/121, 137, 169

[56] References Cited

U.S. PATENT DOCUMENTS

| | | | |
|---|---|---|---|
| 3,812,510 | 5/1974 | Aizawa et al. | 354/173 X |
| 3,872,481 | 3/1975 | Watanabe et al. | 354/23 R |
| 3,946,409 | 3/1976 | Toyoda | 354/173 |
| 4,187,017 | 2/1980 | Watanabe | 354/173 |
| 4,192,599 | 3/1980 | Furuya | 354/173 |

Primary Examiner—Donald A. Griffin
Assistant Examiner—William B. Perkey
Attorney, Agent, or Firm—Fitzpatrick, Cella, Harper & Scinto

[57] ABSTRACT

This invention provides a motor drive mechanism for driving a camera having an automatic exposure control circuit. The motor drive mechanism has a trigger button adapted to be depressed for rotating the motor for releasing the shutter and for winding-up operation consisting of film winding, and simultaneous shutter and mirror charging, and a first switch to be closed in response to the depression of the trigger button for actuating the automatic exposure control circuit. The improved motor drive mechanism of this invention has a detecting means to detect the rotation of the motor for releasing the shutter and the rotation of the motor for the winding-up operation, a second switch connected in parallel with the first switch and closed as the detecting means detects the rotation of the motor for shutter release operation and opened as the detecting means detects the rotation of the motor for winding-up operation. Thus the power supply to the automatic exposure control circuit is ensured even when the trigger button is released from the depression before exposure is finished.

3 Claims, 3 Drawing Figures

MOTOR DRIVE MECHANISM

BACKGROUND OF THE INVENTION

1. Field of the Invention

This invention relates to a motor drive mechanism for driving a camera having an automatic exposure control circuit.

2. Description of the Prior Art

A motor drive mechanism of the class described has been known wherein the mechanism comprises a trigger button to be depressed for driving the motor, and a switch to be closed during the depression of the button for supplying the power to the automatic exposure control circuit. However, the switch device has the following defects. During the exposure of a film especially in case of a long exposure time, it sometimes happens that a photographer would erroneously release the trigger button so that the supply of power to the automatic exposure circuit is discontinued resulting in an improper exposure. For example, in case of the type of camera in which the automatic exposure circuit controls the shutter and the trailing curtain is locked by an electromagnet, if the power supply to the exposure control circuit is interrupted before a required exposure time lapses, the electromagnet is deenergized so that the trailing curtain is released and the shutter is wholly closed thus prematurely interrupting the exposure.

SUMMARY OF THE INVENTION

I have conceived and contribute by the present invention a motor drive mechanism having a switch device which ensures the power supply to the automatic exposure control circuit even when the trigger button is released from its depressed position before the exposure is completed after the shutter release operation.

The motor drive mechanism of this invention comprises a trigger button to be depressed for driving a motor to release the shutter, to wind a film and to charge the shutter, and a first switch which is closed upon depression of the trigger button to actuate the automatic exposure control circuit, wherein the improvement resides in that the mechanism further comprises detecting means to detect the rotation of the motor for the shutter release operation and to detect the rotation of the motor for the wind-up operation, and a second switch connected in parallel with the first switch and opened or closed by the output of the detecting means in such a manner that the second switch is closed when the detecting means detects the rotation of the motor for the shutter release operation and is opened when the detecting means detects the rotation of the motor for the wind-up operation.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWING

Specific embodiments of the invention have been chosen for purposes of illustration and description, and are shown in the accompanying drawings, forming a part of the specification wherein.

DESCRIPTION OF THE PREFERRED EMBODIMENT

Figure 1:
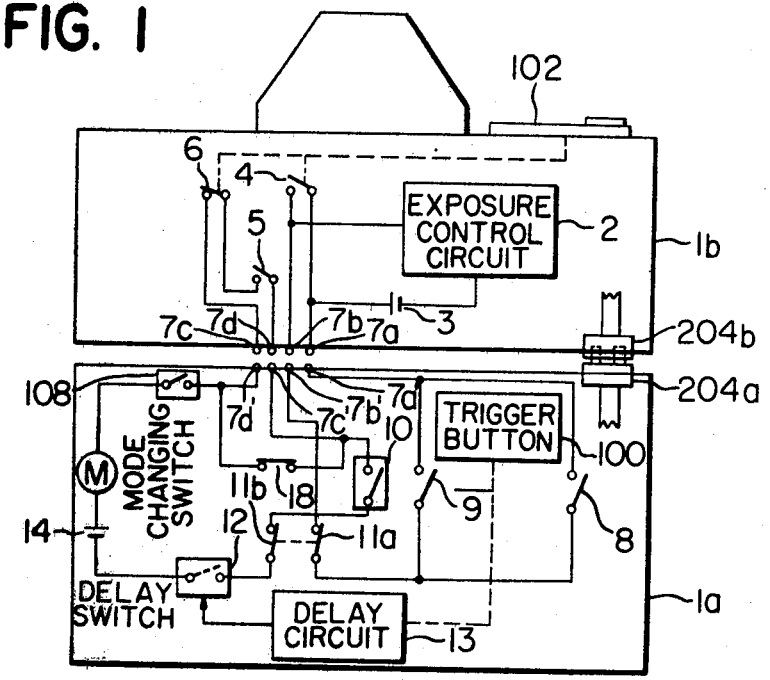
FIG. 1 illustrates a first embodiment of the circuit network of the motor drive unit in which the motor drive mechanism of this invention is mounted on a camera.

This invention will be described in detail referring to the drawing.

FIG. 1 illustrates a first embodiment of the network of the present invention in which the motor drive unit 1a containing the motor drive mechanism is mounted on the camera 1b. The network comprises a first circuit for controlling the drive of the motor and a second circuit for controlling the supply of the power to the automatic exposure control circuit. The first circuit consists of series connected mode changing switch 108, motor M, power source cell 14, delay switch 12, source switch 11b, trigger switch 10, shutter interlocking switch 5 and safety switch 6, and phase switch 18 which is connected in parallel with the shutter interlocking switch 5 and the safety switch 6.

The second circuit consists of series connected automatic exposure control circuit 2, power source cell 3, second photometry switch 9, source switch 11a and a first photometry switch 4, which is connected in parallel with the switches 9 and 11a, and switch 8 connected in parallel with the switch 9.

In the first circuit, the safety switch 6 and shutter interlocking switch 5 are arranged at the side of camera 1b. The safety switch 6 is interlocked with the winding lever 102. When the lever 102 is drawn out from the back of the camera the safety switch 6 is opened and when the lever 102 is pushed into the back of the camera the safety switch 6 is closed. This avoids the possibility of the winding operation by the motor drive mechanism simultaneously with manual winding, so as to prevent injury to the winding-up mechanism of the motor drive mechanism and the camera. In this specification, the term "winding operation" refers not only to the film winding operation, but also to the charging operation of the shutter and mirror.

The shutter interlocking switch 5 is closed between the time when the shutter is closed, i.e. completion of exposure, and the time when the shutter charge is finished, i.e. completion of winding-up. This timing of opening and closing can be attained by, for example, interlocking the switch 5 with the trailing curtain so as to assure that the switch will open when the trailing curtain is being charged.

The first circuit for the side of camera 1b and for the side of motor drive unit 1a is connected at the junctions 7c–7c' and 7d–7d', respectively. At the side of motor drive unit 1a the tirgger switch 10 is closed in response to the depression of the trigger button 100 for shutter release, and once the trigger switch 10 is closed, this closure is maintained until the winding operation is completed, even when the trigger button 100 is released from the depressed position during the phototaking operation.

The mode changing switch 108 is used for selectively switching two modes, the first mode being one frame phototaking by the motor drive mechanism and the second mode being continued phototaking. When the first mode is selected the switch 108 is closed only between the depression of the trigger button 100 and the completion of the winding-up operation, and when the second mode is selected, the switch 108 is always closed.

Figure 2:
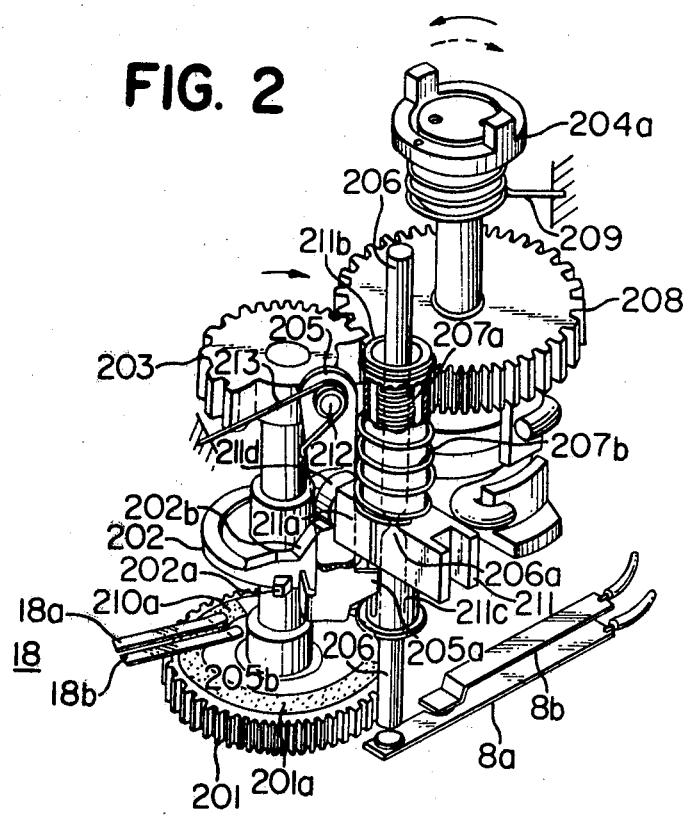
FIG. 2 illustrates an embodiment of the motor drive mechanism associated with FIG. 1.

The phase switch 108 is opened at the time of shutter release in response to the rotation phase of the gear 201 as shown in FIG. 2, and is closed when the winding operation is completed. The structure of the phase switch 18 will be explained later with reference to FIG. 2.

The source switch 11b is opened if the motor drive unit 1a is unnecessary. Explanation regarding delay switch 12 will be made later.

Referring now to the second circuit, it will be seen that at the side of camera 1b, the first photometry switch 4 is interlocked with the winding lever 102. The switch 4 is opened as the lever 102 is pushed in and is closed as the lever 102 is drawn out. The on-off timing of the switch 4 is reverse to that of the safety switch 6. The camera 1b and the motor drive unit 1a are connected at the junctions 7a–7a', and 7b–7b', respectively. In the motor drive unit, the second photometry switch 9 is closed when the trigger button 100 is depressed.

The source switch 11a is interlocked with the source switch 11b and when the motor drive unit 1a is not used, the switch 11a is opened together with the switch 11b. The switch 8 is actuated in response to the rotating phase of the cam plate 202, as shown in FIG. 2, in such a manner that the switch 8 is closed after the motor is driven for shutter release and simultaneously with or before shutter release, and is opened by the rotation of the motor for winding-up. The delay circuit 13 begins the counting upon receipt of the signal to start the power supply of the second circuit and after counting a definite time required for stabilizing the operation of the automatic exposure control circuit 2, it closes the delay switch 12, and this closure of the delay switch 12 is maintained until the winding operation is completed after the circuit 2 reaches a stationary state. The timing of the opening and closure of the switch 12 is attained by connecting in parallel the switch which is closed until or just after the time of shutter release after the completion of the counting and the phase switch which is opened upon completion of the winding operation, and is closed at the time of shutter release in response to the rotating phase of the gear 201 shown in FIG. 2.

The operational sequence from the shutter release to completion of the winding operation of the first embodiment will now be explained. In FIG. 1, both of the source switches 11a and 12b are closed and the safety switch 6 is closed as the winding lever 102 is pushed in, and the first photometry switch 4 is opened. Since the winding operation has already been completed, the shutter interlocking switch 5 is opened and the phase switch 18 is closed. As one-frame phototaking mode is selected, the mode change switch 108 is opened. Thus, the first and the second circuits and the delay circuit 13 are not actuated and the delay switch 12 is opened. From this state, when the trigger button 100 is depressed by a photographer, the switches 9, 10 and 108 are closed. The exposure control circuit 2 is then actuated to begin the photometering of the brightness of an object to be photographed. As the circuit 2 reaches a stationary state, the switch 12 is closed to rotate the motor M and release the shutter. Just before shutter release, the switch 8 is closed, and simultaneously with shutter release, the switches 18 and 5 are opened. Thus, the motor M stops simultaneously with shutter release. If the exposure control circuit 2 is constituted, for example, to control the shutter speed, then the shutter speed is controlled to obtain a proper exposure in response to the respective information of film sensitivity and stop value set previously, as well as the brightness of an object to be photographed. To give a more concrete example, the exposure will be completed by releasing and running the trailing curtain which has been locked by the electromagnet to obtain a proper exposure time. Simultaneously with exposure completion, the switch 5 is closed to initiate the rotation of the motor M for starting the winding operation. In response to rotation of the motor, the switch 8 is opened and upon completion of the winding operation, the switch 108 is opened to stop the motor M, and all of the circuit elements return to their initial positions, respectively.

As is apparent from the foregoing explanation, even when the trigger button 100 is released from its depressed position during shutter opening to open the switch 9, the switch 8, connected in parallel with the switch 9 is being closed and the power supply to the automatic exposure control circuit 2 is maintained. Consequently, proper exposure control is ensured.

Next, the interlocking mechanism of the switch 8 together with the winding operation of the motor drive mechanism and the shutter release mechanism will be explained. FIG. 2, shows the winding-up and shutter release mechanism at the time of initiating the winding operation. The rotation of the motor M is reduced through a gear train and transmitted to the gear 201 to rotate the cam plate 202 and the gear 203 clockwise. It will be noted that the gear 203 has a toothless or cut-out portion and that both the cam plate 202 and gear 203 are mounted on the same rotatable shaft. The rotation of the gear 203 is transmitted to the coupling 204a through the gear 208. The rotation of the coupling 204a will effect the winding operation through the coupling 204b mounted at one end of the film winding shaft at the side of camera and engaged with the coupling 204a, as shown in FIG. 1. The anticlockwise rotation of the coupling 204a gives clockwise energy to the torsion coil spring 209, one end of which is fixed to the coupling 204a and the other end of which is fixed to an immovable member. Upon completion of the winding-up of one frame of the film at the side of camera, the cut-away portion of the gear 203 faces the gear 208, gears 203 and 208 being thus disengaged. Therefore, the coupling 204a and the gear 208 rotate clockwise by the force of the spring 209 to return to the state they were in before film winding. Obviously, the member which has been charged with the winding-up operation at the side of camera will not return to the position it occupied prior to film winding-up, until it is released.

As mentioned in the explanation of FIG. 1, so far as the mode change switch 108 is in position for selecting the first mode for one-frame phototaking, even though a photographer continues to depress the trigger button 100, the rotation of the motor M stops when the switch 108 is opened upon completion of the winding-up operation. When a photographer releases the depression of the trigger button 100 and then again depresses the button 100, the switches 10 and 108 are closed to rotate the motor to release the shutter. At the beginning, this rotation of the motor is not transmitted for winding up the shaft at the side of camera since the gears 203 and 208 are not engaging with each other, and just prior to the engagement of these two gears, shutter release is effected and the motor M stops by reason of the opening of the switch 18 in synchronism with shutter release.

The shutter release mechanism and the timing of opening and closure of the switch 8 interlocking with the shutter release mechanism will now be explained in detail.

As shown in FIG. 2, the slider 211 consists of the cylindrical portions 211b and 211c, provided at upper and lower ends of the roller supporting portion 211a, respectively. A reciprocating member 206 is reciprocatingly movable within a cylinder of the slider 211. The slider 211 and the cam plate 202 are arranged to form the face cam device such that the roller 211d rotatably supported at the left end of the roller supporting portion 211a contacts the contoured curved surface 202b of the cam plate 202 to reciprocate linearly. The energized force of the coil spring 207b provided at the outer periphery of the upper cylindrical portion 211b of the slider 211 and fixed at one end to the slider 211 and at the other end to an unshown immovable member, will always urge the roller 211d toward the contoured curved surface 202b to ensure the motion of the face cam device.

FIG. 2 further shows the slider 211 at the uppermost position of its reciprocating linear movement. The reciprocating member 206 and the slider 211 are connected by the coil spring 207a provided between the inner periphery of the slider 211 and the outer periphery of the reciprocating member 206. It will be noted that a part of the spring 207a is exposed by cutting a part of the upper cylindrical portions 211b of the slider 211. The spring 207a is not energized in FIG. 2. The locking member 205 is rotatably supported by the shaft 212, mounted on a not-shown immovable member, and is energized in counterclockwise direction by torsion coil spring 213, one end of which is supported by the immovable member. Consequently, the locking portion 205a projected at the lower right end of the locking member 205 always contacts the reciprocating member 206 passing through a groove provided on the slider 211 along its moving direction and having a length corresponding to the stroke of reciprocating movement. The locking member 205 is partially broken away in FIG. 2 in order to make visible the roller 211d as well as the contour 202b of the cam plate 202.

From the state of FIG. 2, in which the winding operation starts, the motor continues to rotate and the slider 211 and the reciprocating member 206 of the cam device immediately arrive at the lower-most point of reciprocating linear movement. At this time, the constricted portion 206a, shown by broken lines, of the reciprocating member 206 and located with in the slider 211, engages the locking portion 205a of the locking member 205. As the motor further rotates and the winding-up operation approaches its completion, the slider 211 is lifted by the camp late 202. However, since the reciprocating member 206 is locked by its constricted portion 206a engaging with the locking member 205, the member 206 can not be raised together with the slider 211. At this time, the coil spring 207a is energized in the direction to raise the reciprocating member 206. Upon completion of the winding-up operation the motor stops, and the slider 211 reaches the uppermost position of its moving stroke. When the trigger button 100 is depressed for shutter release, the motor begins to rotate, and during a slight clockwise movement of the cam plate 202, interlocked with the rotation of the motor, the projection 202a provided at the periphery of the cam plate 202, engages the lower left bent portion 205b of the locking member 205 to rotate the locking member 205 instantly in the clockwise direction against the energizing force of the spring 213. In the instantaneous period, the reciprocating member disengages from the locking member 205. The reciprocating member 206 moves to its uppermost position by the force of the coil spring 207a to push a not-shown releasing member for releasing the camera shutter mechanism, and shutter release is performed. As mentioned before, the motor then stops and all other mechanisms stop. The switch 8 consists of switching pieces 8a and 8b as shown in FIG. 2, and is actuated as the lower end of the reciprocating member 206 engages with the free end of the switching piece 8b. The switch 8 is closed when the member 206 arrives at the uppermost position of its reciprocating movement, i.e. just prior to shutter release, and the switch 8 is opened when the member 206 arrives at its lowermost position, i.e. after the shutter release is completed and just after the beginning of the winding-up operation.

The phase switch 18 consists of the switching pieces 18a and 18b, and while the switching piece 18a slides on the insulating portion 201a provided on the upper surface of the metallic gear 201, i.e. between shutter release and the completion of winding-up operation, the switch 18 is opened.

In this embodiment, the timing of the opening and closing of the switch 8 is attained by detecting the rotation of the motor for shutter release and winding operation with the aid of the movement of the reciprocating member in response to the rotating phase of a shaft connected to the rotating shaft of the motor. However the switch 8 can be opened or closed by directly detecting the rotating phase angle of a shaft connected to the rotating shaft of the motor without using the reciprocating member, such as switch 18.

Since the automatic exposure control circuit 2 is actuated at a low voltage, switches to be used in the power supply circuit for exposure control circuit 2 should not be a semiconductor switch having a resistance under the conductive state and consequently, the switches 8 and 9, having contacts as shown in the first embodiment, are preferable.

Figure 3:
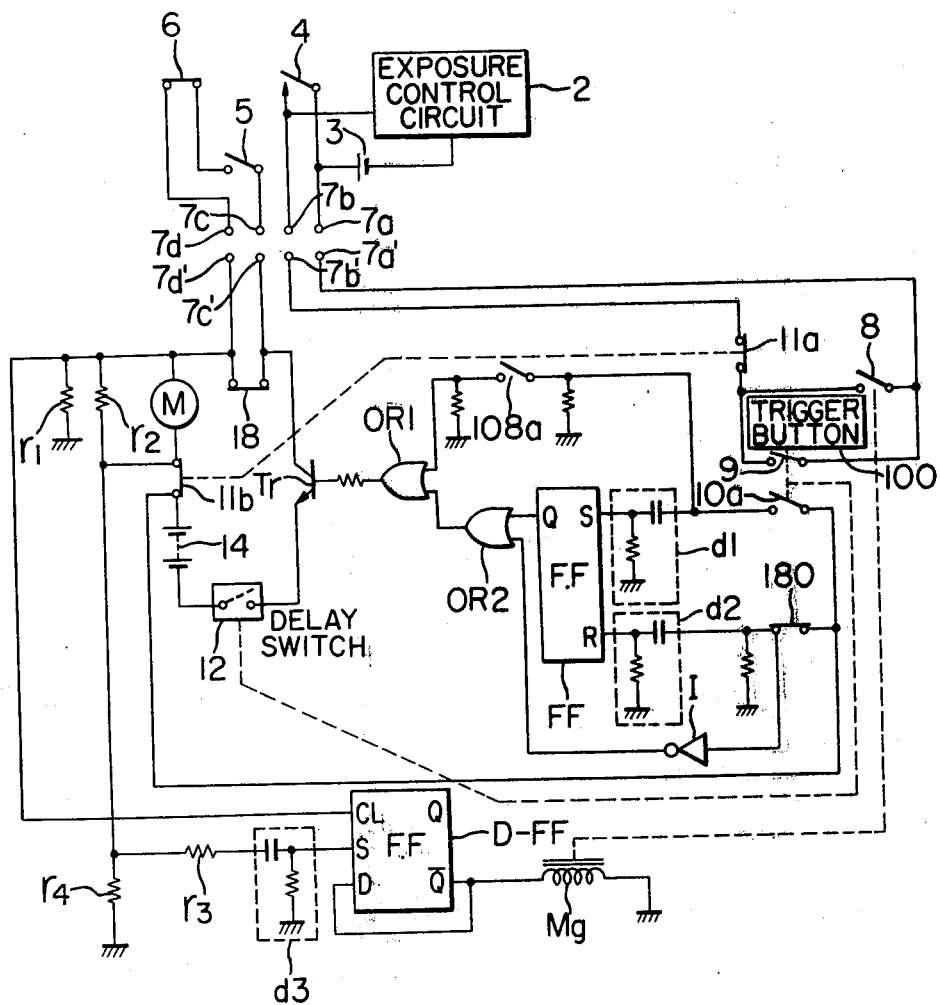
FIG. 3 is a second embodiment of the circuit network of this invention.

FIG. 3 shows a second embodiment in which an electromagnet switch, which of the kind having contacts, is used as switch 8.

In FIGS. 2 and 3, circuit elements having the same functions are assigned with common reference numerals, respectively. Explanation will be made on the constitutional elements of the second embodiment which are different from those of the first embodiment.

In the second embodiment, the following logic circuits are used instead of switches 10 and 108. In FIG. 3, one end of the switch 10a closed in interlock with the depression of the trigger button 100 is connected to the positive pole of the cell 14 for driving the motor and the other end is connected to the set input terminal S of flip-flop FF through differential circuit $d_1$ and also connected to one of the input terminals or OR gate $OR_1$ through switch 108a. The switch 108a is opened when the one-frame phototaking mode is selected, and is closed when continuous phototaking is selected. The phase switch 180 having the same opening-closing timing as of the phase switch 18 is connected at one end to the positive pole of the cell 14 and at the other end to the Reset input terminal R of flip-flop FF through differential circuit $d_2$ and to one of the input terminals OR gate $OR_2$ through an inverter I. The output terminal Q of the flip-flop FF is connected to the other input terminal of OR gate or $OR_2$, and the output terminal of OR gate $OR_2$ is connected to the other input terminal of OR gate $OR_1$. The output terminal of OR gate $OR_1$ is connected to the base terminal of the switching transistor Tr, the collector and emitter terminals of which are connected in series to the motor drive circuit.

The operation of the logic circuit is as follows. The switch 108a is opened as one-frame phototaking is selected. As the trigger button 100 is depressed, the switch 10a is closed and at that moment, the set input power enters the set input terminals S, and the output terminal Q becomes a high level (H level) potential. H level potential of the output terminal of OR gate $OR_1$ makes the transistor Tr conductive. Consequently, motor M rotates and the shutter is released and after the shutter opening and completion of winding, the phase switch 180, which has been opened simultaneously with the shutter release, is closed. At this moment, reset input power enters rest input terminal R and the output terminal Q becomes low level (L level), so that OR gates $OR_2$, $OR_1$ become inactive, and the transistor Tr becomes non-conductive.

As the continuous phototaking mode is selected and the switch 108a is closed, so far as the depression of the trigger button 100 continues, the active state of OR gate $OR_1$ and the conductive state of the transistor Tr are maintained. In this case, even when the depression of the trigger button 100 is released during the rotation of the motor, the output terminal of the inverter I retains a positive potential as the phase switch 180 is opened during winding operation. Therefore, OR gates $OR_2$ and $OR_1$ maintain their active states until the completion of the winding operation at which time the phase switch 180 is closed. Thus the transistor Tr will not be non-conductive during the winding operation and the motor will not be stopped.

Explanation will now be made for the logic circuit to obtain electrically the timing of opening-closing of the switch 8, which has been obtained mechanically in the first embodiment by cam device, reciprocating member 206. The input terminal CL of D flip-flop is connected to the negative terminal of the motor M, to ground through resistor $r_1$ and to the positive pole of the cell 14 through other register $r_2$ and source switch 11b. The set input terminal S of D flip-flop is connected to the differential circuit $d_3$, to ground through two resistors $r_3$ and $r_4$ and to positive pole of the cell 14 through the resistor $r_3$ and the switch 11b. The output $\bar{Q}$ of D flip-flop is connected to the input terminal D and D flip-flop is converted to a binary flip-flop. The output terminal $\bar{Q}$ is also connected to ground through the electromagnet Mg of the relay.

Next, the operation of the logic circuit is explained. When the source switch 11b is closed, a differential pulse enters the input terminal S of D flip-flop, and the potential of the input terminal CL becomes H level, thus the output terminal $\bar{Q}$ becomes L level potential. Then the trigger button 100 is depressed, the transistor Tr becomes conductive and power is supplied to the motor M, the motor rotates, the shutter release is effected and the potential of the input terminal CL is changed from H level to L level, by which the potential of the output terminal $\bar{Q}$ is changed from L level to H level. The output of the output terminal Q energizes the electromagnet Mg to close the switch 8. Simultaneously with the completion of the shutter release, power supply to the motor is stopped so that the potential of the input terminal CL becomes H level. Subsequently, the shutter is closed and winding power is supplied to the motor M to change the potential of the input terminal CL from H level to L level, according to which the potential of the output terminal $\bar{Q}$ is changed from H level to L level, so that the electromagnet Mg is deenergized to open the switch 8.

The motor drive mechanism may be contained in a unit separable from the camera or in the camera itself.

I believe that the construction and operation of my novel motor drive mechanism will now be understood and that the several advantages thereof will be fully appreciated by those persons skilled in the art.

I claim:

1. In a motor drive mechanism for driving a camera having an automatic exposure control circuit comprising a trigger button depressable for rotating the motor to cause shutter releasing operation and wind-up operation, a first switch being closed in response to the depression of the trigger button to actuate said automatic exposure control circuit, the improvement comprising means for detecting the rotation of the motor for the shutter release operation and rotation of the motor for the winding-up operation; and a second switch connected in parallel with said first switch and closed or opened by the output of said detecting means; the second switch being closed when the detecting means detects the rotation of the motor for the shutter release operation and opened when the detecting means detects the rotation of the motor for the winding-up operation.

2. A motor drive mechanism according to claim 1, in which said detecting means includes a reciprocating member movable between a first position to release the shutter and a second position not releasing the shutter mechanism, the member moving from the second position to the first position in response to the rotation of the motor for the shutter release operation and during this movement the second switch is closed, and from the first position to the second position in response to the roration of the motor for the winding-up operation and during this movement the second switch is opened.

3. A motor drive mechanism according to claim 1 or 2, in which said camera further comprises a winding lever movable between a first position drawn out from the camera and a second position pushed in the camera; a third switch connected in parallel with the first switch, the third switch being closed when the lever is drawn out and opened when the lever is pushed in; and a fourth switch, which is opened in response to the drawing-out operation of the lever to disable the drive of the motor drive mechanism and is closed in response to the pushing-in operation of the lever to enable the motor drive mechanism to be driven.

* * * * *